(12) United States Patent
Sato et al.

(10) Patent No.: US 6,512,819 B1
(45) Date of Patent: Jan. 28, 2003

(54) TELEPHONE APPARATUS

(75) Inventors: Shinichi Sato, Miyagi (JP); Yukio Sato, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/610,459

(22) Filed: Jul. 5, 2000

(30) Foreign Application Priority Data

Jul. 6, 1999 (JP) .......................................... 11-192109

(51) Int. Cl.⁷ ............................................. H04M 11/00

(52) U.S. Cl. .............................. 379/93.23; 379/357.01; 379/355.01

(58) Field of Search .......................... 348/14.01, 14.02, 348/14.03, 14.04, 14.05, 14.06; 379/142, 354, 355, 356, 93.23, 2, 5, 379, 380, 382, 359.1

(56) References Cited

FOREIGN PATENT DOCUMENTS

| JP | 402052547 A | * | 2/1990 | .......... H04M/1/274 |
| JP | 402298990 A | * | 12/1990 | ............ G09G/5/22 |
| JP | 403089658 A | * | 4/1991 | .......... H04M/1/274 |
| JP | 407030872 A | * | 1/1995 | ............ H04N/7/14 |

* cited by examiner

*Primary Examiner*—Melur Ramakrishnaiah
(74) *Attorney, Agent, or Firm*—Pearne & Gordon LLP (57) ABSTRACT

When a call has been transmitted to a telephone apparatus of a user through a communication means, a control means 102 extracts identification data, such as the telephone number, indicating the connected telephone. Then, a comparison is made between extracted data and the telephone number stored in the storage means 104. When coincident registered data is present, the address of a portion in which related image data has been stored is read. Then, reading of the address of the portion in which image data has been stored is controlled to extract image data in a corresponding memory card 103. Extract image data is transferred to a display portion 101 so as to be displayed.

5 Claims, 9 Drawing Sheets

| TELEPHONE NUMBER | ADDRESS | ADDRESS OF PORTION IN WHICH IMAGE DATA IS STORED |
|---|---|---|
| 0**-1****-**** | ***** SENDAI, MIYAGI PREFECTURE | 00H TO 1fH IN MEMORY CARD |
| 0**-2****-**** | | 20H TO 3fH IN MEMORY CARD |
| | | 40H TO 5fH IN MEMORY CARD |
| | | |

TELEPHONE APPARATUS

BACKGROUND OF THE INVENTION

1. Field of the Invention

The present invention relates to a telephone apparatus having a telephone directory function, and more particularly to a telephone apparatus which is capable of registering image data into a telephone directory data base.

2. Description of the Related Art

A conventional telephone apparatus has the telephone book function which is a service provided such that telephone book data on the basis of characters, such as the telephone numbers, addresses and names is registered. When a call is performed by the caller, the telephone number, the name and the like of the caller registered into the telephone book data base are displayed so as to identify the caller before conversation is started. As disclosed in JP-A-8-242307, a service has been provided with which image data is extracted through a communication line during the communication with the caller so a to register image data into the telephone book data base.

The conventional telephone directory function of the telephone apparatus cannot display image data, such as a photograph of the face of the person of the connected telephone, when a call has been made.

SUMMARY OF THE INVENTION

To achieve the foregoing problem, an object of the present invention is to provide a telephone apparatus which enables the user to readily recognize the caller when a call has been made by displaying registered image data, such as a photograph of the face of the caller, as well as display of characters, such as the telephone number, the name and the like of the caller when the call is made and with which an interface means for registering image data is not limited.

Another object of the present invention is to provide a telephone apparatus with which the privacy of a registered subscriber is protected by causing a memory card in which an ID code intrinsic to the user has been included to be held by a user to inhibit required use of the telephone directory function from a person except for the registered user without any input of the ID code to be compared.

To solve the foregoing problems, according to the present invention, there is provided a telephone apparatus having a telephone directory function, comprising: communication means; means for registering image data input through the communication means into a telephone directory data base; means for extracting identification information indicating the caller when a communication and connection requirement has been received from a caller through the communication means; means for making a comparison between extracted identification information and information registered into the telephone directory data base; and display means for displaying registered image data in accordance with a result of the comparison. Since the foregoing structure is employed, an image, such as a photograph of the face, is displayed as a means for recognizing the caller when a call has been made. Thus, visibility exhibiting an excellent visual effect can be realized.

Moreover, there is provided means for transmitting image data or telephone directory data including image data through the communication means. Since the structure is formed as described above, sharing of the telephone directory data, addition of telephone directory data to an electronic mail and connection to an external apparatus for constituting telephone directory data can easily be performed.

Moreover, there is provided a function which relates identification information for identifying the caller and image data to each other and sorting image data and identification information so as to store image data and identification information in different areas. Since the structure is formed as described above, image data and identification information can be sorted from each other so as to be registered into difference storage areas.

Moreover, the structure is arranged such that a memory card in which an ID code intrinsic to a user has been stored can be included or detached/removed, and in a case where the memory card is not connected, functions including registration, transmission and display of image data a are inhibited. Since the structure is formed as described above, the functions including registration, transmission and display of image data are permitted in only a state where the memory card in which the intrinsic ID code has been stored is connected.

Moreover, the ID code of the connected memory card is automatically registered into the telephone directory data base. Since the structure is formed as described above, the operation for registering the ID code required when the memory card is connected is not required.

Moreover, a comparison between the ID code registered into the telephone directory data base and the ID code of the connected memory card is made, and when the two ID codes coincide with each other, the functions including registration, transmission and display of image data are made to be effective. Since the structure is formed as described above, requirement for performing registration, transmission and display of image data from a person except for the person registered into the telephone directory data can be rejected.

Moreover, the structure is arranged such that a memory card having a memory region in which telephone directory data is stored can be included or detached/removed, and in a case where the memory card is not connected, the functions including registration, transmission and display of image data are inhibited. Since the structure is formed as described above, registration, transmission and display of image data are inhibited in a state where the memory card is not connected.

Moreover, a function is provided with which telephone directory data is stored in the region in which telephone directory data is stored. Since the structure is formed as described above, the data base of the telephone directory registered by another telephone apparatus can be used. Moreover, the size of the memory which must be included in the telephone apparatus can be reduced.

Moreover, there is further provided means for changing the parameter value of image data stored in the region in which telephone directory data is stored or image data input through the communication means. Since the structure is formed as described above, image data can be adapted to the performance of the telephone apparatus of the user or the display unit of the caller apparatus.

DESCRIPTION OF THE PREFERRED EMBODIMENTS

A first embodiment of the present invention has a structure such that image data input through a communication means is related to personal information of a user of the caller. Then, image data is stored in the area for storing telephone directory data. When a call has been performed, identification information of the caller contained in a received signal is extracted. When coincident identification information has been registered, image data is read and displayed.

Figure 1:
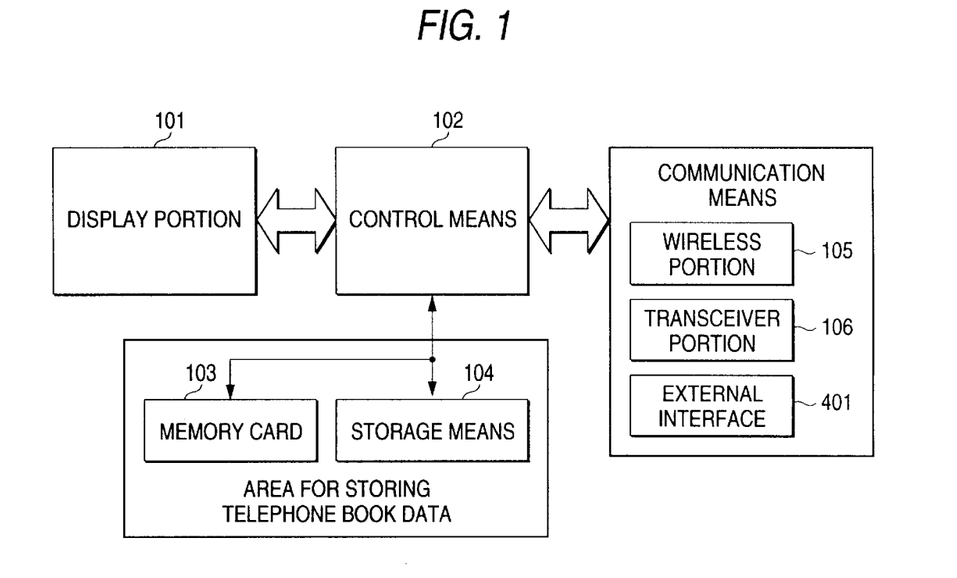
FIG. 1 is a block diagram showing a first embodiment of a telephone apparatus according to the present invention.

FIG. 1 is a block diagram showing the first embodiment of the telephone apparatus according to the present invention. The telephone apparatus having an image data registering function incorporates a control means 102; a display portion 101 connected to the control means; a communication means and an area in which telephone-book data is stored.

The display portion 101 is able to display information about the user of the caller including image data. The communication means incorporates a tranceiver portion 106 provided for a PHS or the like; and an external interface for performing serial communication by a spatial light transmission or through a cable. The area in which telephone-book data is stored is composed of a memory card 103 which can be included in the telephone apparatus or which is made to be detachable/removable from the telephone apparatus; and a storage means 104 included in the telephone apparatus. The control means 102 performs registration of telephone directory data in the area in which telephone-book data is stored, reading of telephone directory data from the area in which telephone-book data is stored, extraction of telephone directory data (image data) provided through the communication means and control of addition of telephone directory data which is transmitted through the communication means. The area in which telephone-book data is stored may be provided for only either of the memory card 103 or the storage means 104.

Figure 2:
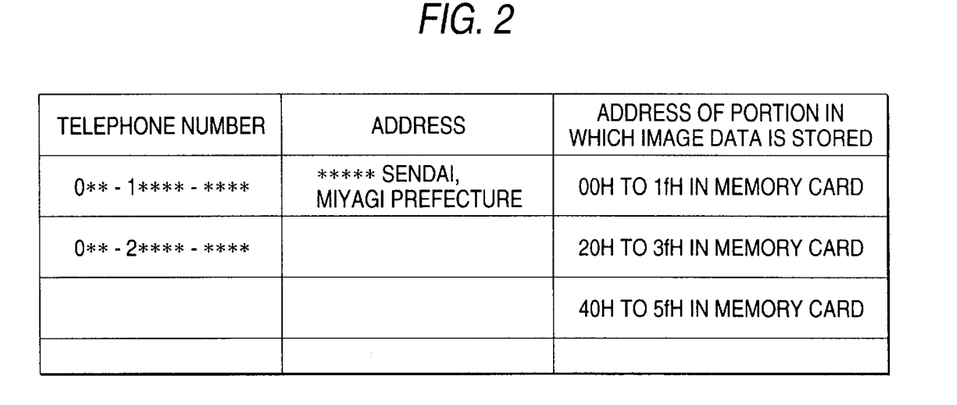
FIG. 2 is a diagram showing an example of the structure of telephone directory data in the storage means shown in FIG. 1.

FIG. 2 shows an example of the structure of telephone directory data in the storage means 104. The telephone directory data is composed of a telephone number, the address of a user and the address of a portion in which image data has been stored. The address of a portion in which image data has been stored indicates the address in the memory card 103. That is, the storage means 104 stores data of telephone directory data except for image data. Moreover, image data having a large quantity of data is stored in the memory card 103. Thus, the storage capacity of the storage means 104 included in the body of the telephone apparatus can be reduced.

The operation of the telephone apparatus having the image-data registering function according to the first embodiment will now be described. Initially, the operation or registering image data of a photograph of the face as telephone directory data will now be described with reference to FIG. 3.

Figure 3:
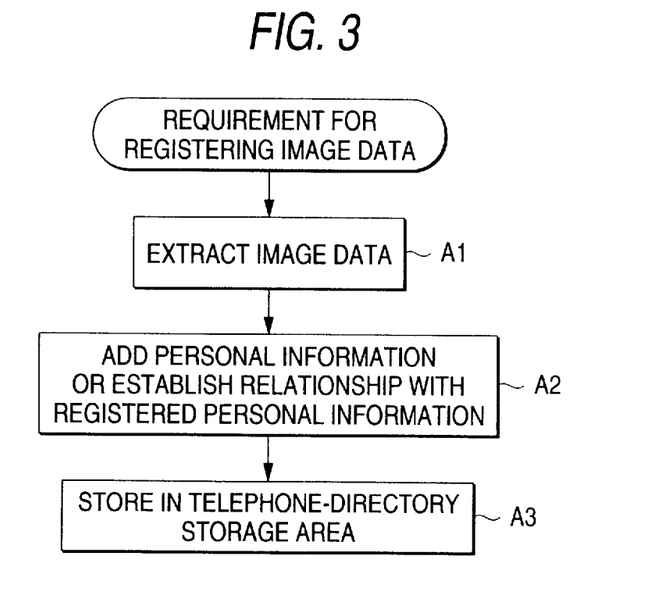
FIG. 3 is a flow chart showing the operation which is performed when image data is registered into the telephone apparatus shown in FIG. 1.

When a user registers image data of the photograph of the face intrinsic to the person of the caller as information of the caller of telephone directory data, image data is received through any one of the wireless portion 105, the tranceiver portion 106 of the communication means and the external interface 107. Then, the control means 102 extracts image data (steps A1).

The control means 102 adds personal information, such as the telephone number and name to extracted image data owing to the operation performed by the user. As an alternative to this, the control means 102 relates extracted image data to personal information which has been registered. Then, the image data is restructured. Then, image data is stored in the area in which telephone-book data is stored (step A2 and A3).

At this time, telephone directory data may be stored either of the memory card 103 or the storage means 104, image data of telephone directory data is stored in the memory card 103 in the area for storing telephone directory data by the control means 102.

Personal information data except for image data is stored in the storage means 104. At this time, the address of the portion in the memory card 103 in which image data has been stored is written over the area for the address of the portion of the storage means 104 in which image data has been stored or newly stored. Thus, image data constituting telephone directory data and personal information, such as the telephone number and the address, are related to each other.

When the address of a portion of the memory card 103 in which image data is stored is determined, a reference may be made to the address of a portion in the storage means 104 in which image data is stored to determine the portion in which image data is stored. As an alternative to this, image data may be stored in the storage means 104 and the data of personal information may be stored in the memory card 103. In the foregoing case, image data and data about personal information are related to each other similarly to the foregoing case.

Figure 4:
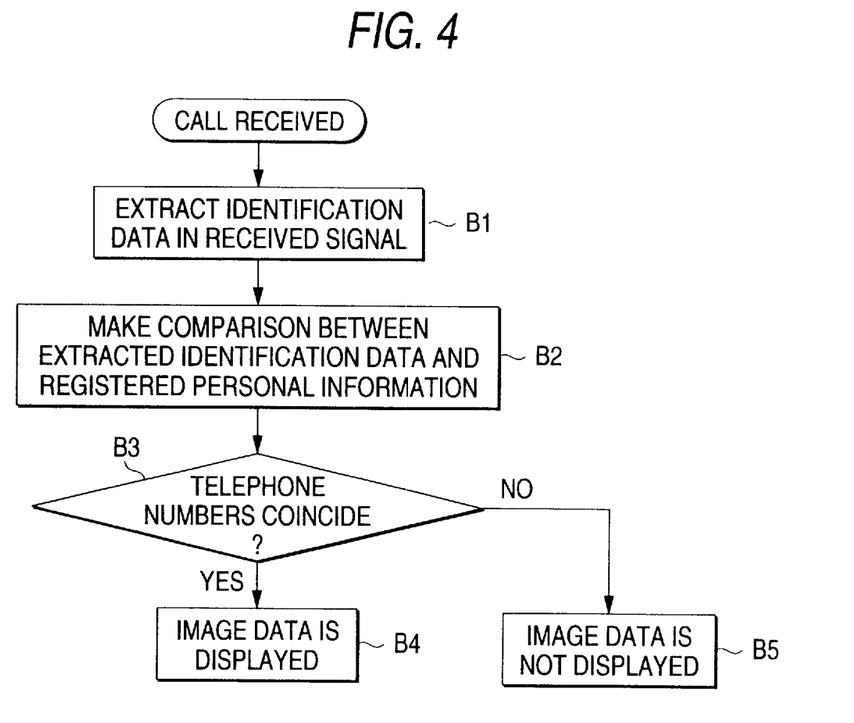
FIG. 4 is a flow chart showing the operation which is performed when a call has been received by the telephone apparatus shown in FIG. 1.

An example of the operation which is performed when image data of the photograph of the face of a person of the caller after a call has been made will now be described with reference to FIG. 4.

When a call has been made to the telephone apparatus of the user through the wireless portion 105 or the tranceiver portion 106, the control means 102 extracts identification data, such as the telephone number indicating the caller from received data (step B1).

Then, the control means 102 makes a comparison between extracted identification data and personal information data, such as the telephone number, stored in the storage means 104 to determine whether or not coincident registered data is present (steps B2 and B3).

When coincident registered data is present, control is performed to read the address of the portion in which related image data has been stored. Thus, image data in the corresponding memory card 103 is extracted. Extracted image data is transferred to the display portion 101 so as to be displayed through the display means in the display portion 101 (step B4). When coincident registered data is not present, image data is not displayed. As an alternative to this, personal information data except for image data is displayed (step B5).

As described above, according to the first embodiment of the present invention, personal information in the storage means 104 and image data are related to each other. Thus, data, such as image data, having a large quantity of information can be sorted and registered into the memory card 103. Hence it follows that the size of the memory in the telephone apparatus can be reduced. Moreover, the control means 102 extracts image data of the caller from identification code (for example, the telephone number) of the caller. Therefore, the photograph of the face of the caller can be displayed when a call has been made. As a result, visual identification of the caller can easily be performed.

A second embodiment of the present invention is structured such that an ID code of the memory card of the telephone apparatus is given to image data when image data input through the communication means is related to personal information of the caller so as to be stored in the area in which telephone-book data is stored. When a call has been received or when a requirement for confirming the contents of the telephone directory data has been made, a comparison is made between the ID code of the memory card connected to the telephone apparatus and the ID code given to personal information stored in the area for storing telephone directory. Thus, access except for a person registered into the telephone directory data is inhibited.

Figure 5:
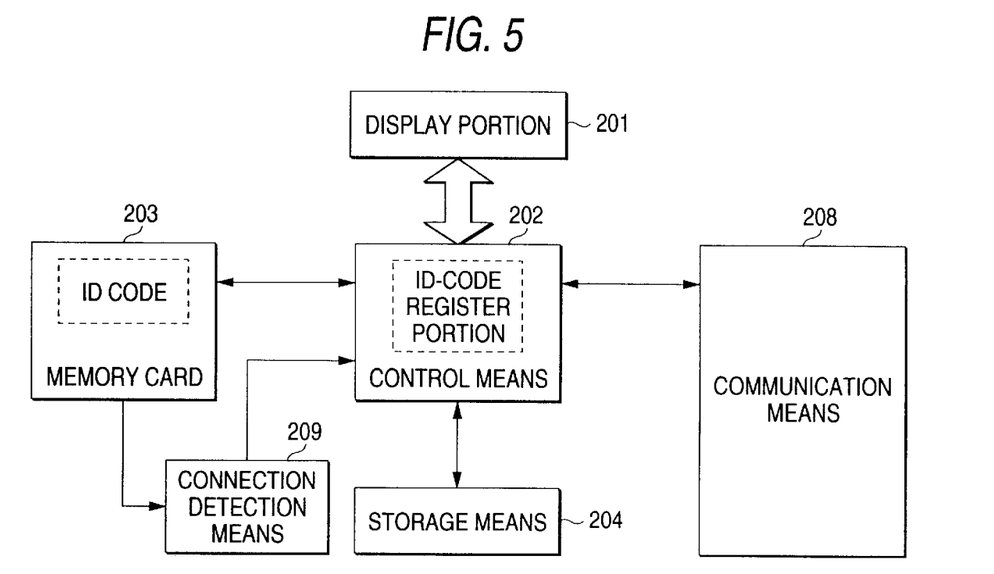
FIG. 5 is a block diagram showing a second embodiment of the telephone apparatus according to the present invention.

FIG. 5 is a block diagram showing a second embodiment of the telephone apparatus according to the present invention. The telephone apparatus having the function for registering image data incorporates a control means 202, a communication means 208, a storage means 204 and a display portion 201 connected to the control means 202. Moreover, the telephone apparatus incorporates a memory card 203 connected to the telephone apparatus and a connection detecting means 209 for detecting whether or not the memory card 203 has been connected to communicate a result of detection to the control means 202.

An ID code intrinsic to the card is previously written on the memory card 203. The control means 202 has a similar function to that of the control means 102 according to the first embodiment. The control means 202 according to the second embodiment has an ID-code register portion. The communication means 208, the storage means 204 and the display portion 201 are structured similarly to the corresponding means and portion according to the first embodiment.

The operation of the telephone apparatus having the function for registering ID code according to the second embodiment will now be described. An operation of the control means 202 to register an ID code into the ID-code register portion will now be described. When the memory card 203 has been connected to the telephone apparatus, the foregoing fact is communicated to the control means 202 through the connection detecting means 209. The control means 202 which has received the communication signal reads the ID code in the memory card 203 to register the ID) code into the ID-code register portion in the control means 202. After the memory card 203 has been removed from the telephone apparatus, the foregoing fact is communicated to the control means 202 through the connection detecting means 209. The control means 202 which has received the communication signal erases the ID code registered into the ID-code register portion.

Figure 6:
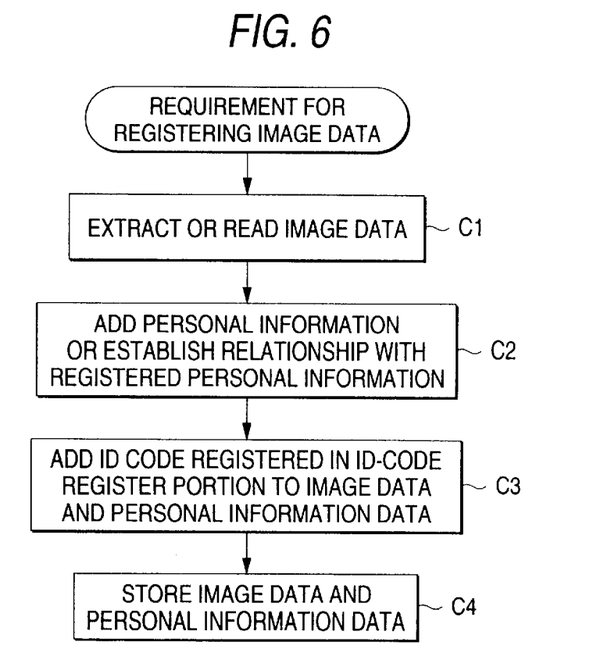
FIG. 6 is a flow chart showing the operation which is performed when image data is registered into the telephone apparatus shown in FIG. 5.

Referring to FIG. 6, the operation which is performed when a requirement for registering image data of the telephone directory has been made from a user will now be described. when a user registers image data (for example, a photograph of the face) which is intrinsic to the connected telephone as information of a connected telephone in the telephone directory, image data is received through the communication means 208 so as to be extracted by the control means 202. As an alternative to this, image data stored in the memory card 203 is read by the control means 202 (step C1).

The control means 202 adds personal information, such as the telephone number and the name, to extracted or read image data owing to the operation performed by the user. As an alternative to this, registered personal information data may be related to image data (step C2).

Then, the control means 202 adds ID code registered into the ID-code register portion to both of image data and personal information data to reconstruct as telephone directory data having ID codes (step C3). At this time, a terminal code intrinsic to the telephone apparatus may be added as well as the ID code registered into the ID-code register portion.

Finally, telephone directory data is stored (step C4). Telephone directory data may be stored in either of the memory card 203 or the storage means 204. In this embodiment, image data of telephone directory data is stored in the memory card 203 by the control means 102. Personal information data except for image data is stored in the storage means 204. At this time, the address of a portion in the memory card 203 in which image data has been stored is written over the area in which the address of a storage portion is stored so as to be stored or the address is newly stored. Thus, image data constituting telephone directory data and personal information, such as the telephone number and the address, are related to each other. When the address of a storage portion is determined to store image data in the memory card 203, a reference to the area in which the address of a storage portion is stored may previously be performed to determine the portion in which image data is stored. As an alternative to this, image data may be stored in the storage means 204 and personal information data may be stored in the memory card 203. A method of relating image data and personal information data to each other is similar to the foregoing method.

Figure 7:
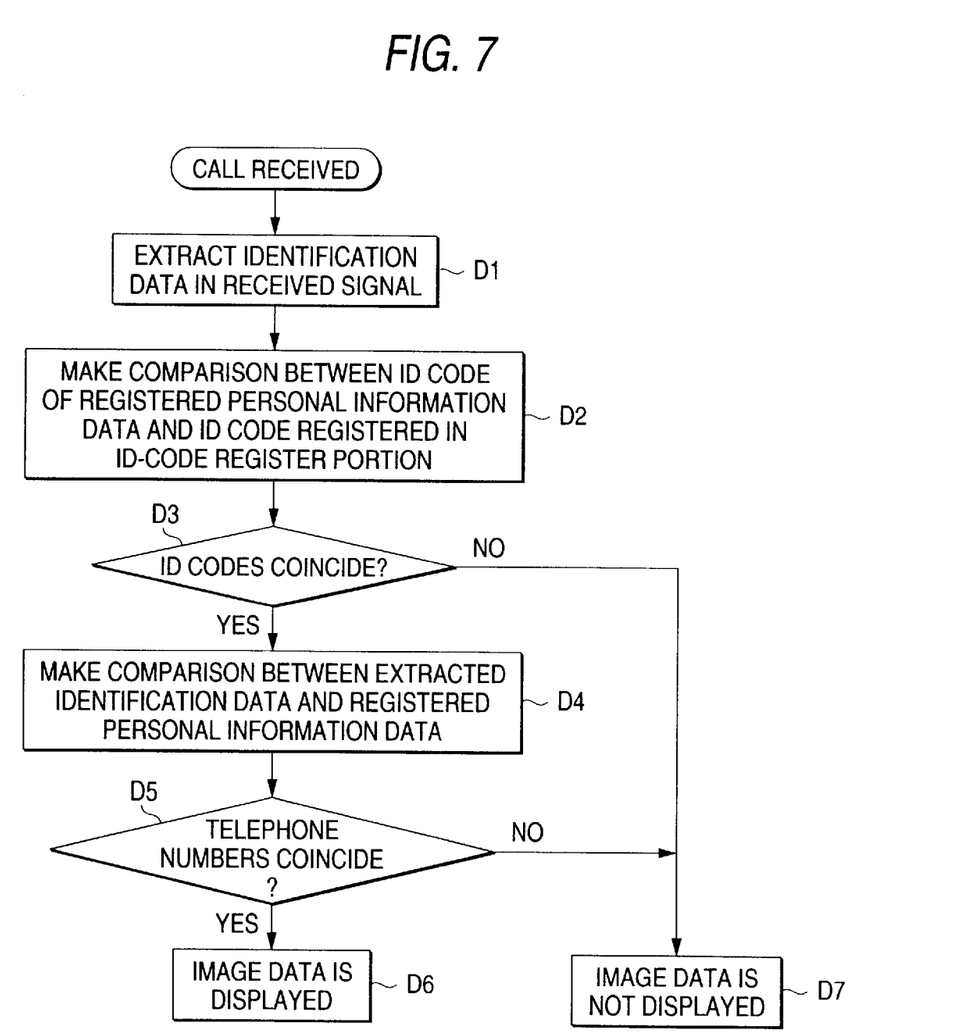
FIG. 7 is a flow chart showing the operation which is performed when a call has been received by the telephone apparatus shown in FIG. 5.

An example of the operation which is performed when image data, which is the photograph of the face of a connected telephone, is displayed when a call has been received will now be described with reference to FIG. 7. As a precondition of FIG. 7 (as well as FIGS. 8 and 9), the memory card 203 has been connected to the telephone apparatus and the foregoing fact has been communicated to the control means 202 by the connection detecting means 209.

When a call has been received to the telephone apparatus of the user through the communication means 208, the control means 202 extracts identification data, such as the telephone number, indicating the caller from received data in the control means 202 (step D1), The control means 202 makes a comparison between the ID code added to personal information data stored in the storage means 204 and the ID code registered into the ID-code register portion (step D2). When personal information data having the same ID code has been detected (YES in step D3), a comparison is made between extracted identification data and the telephone number or the like in the personal information data (step D4).

Only when coincident registered data is present, the coincident registered data is transferred to the display portion 201. When the inside portion of the registered data and image data has been related to each other, a control is performed to read the address of a portion in which image data is stored. Thus, corresponding image data in, for example) the memory card 203 is extracted so as to be transferred to the display portion 201. Transferred image data is displayed through the display means in the display portion 201 (step D6). When the ID codes do not coincide with each other in step D3 or when a determination is made in step D5 that there is not registered data, image data is not displayed. As an alternative to this, personal information data except for image data is displayed (step D7).

Figure 8:
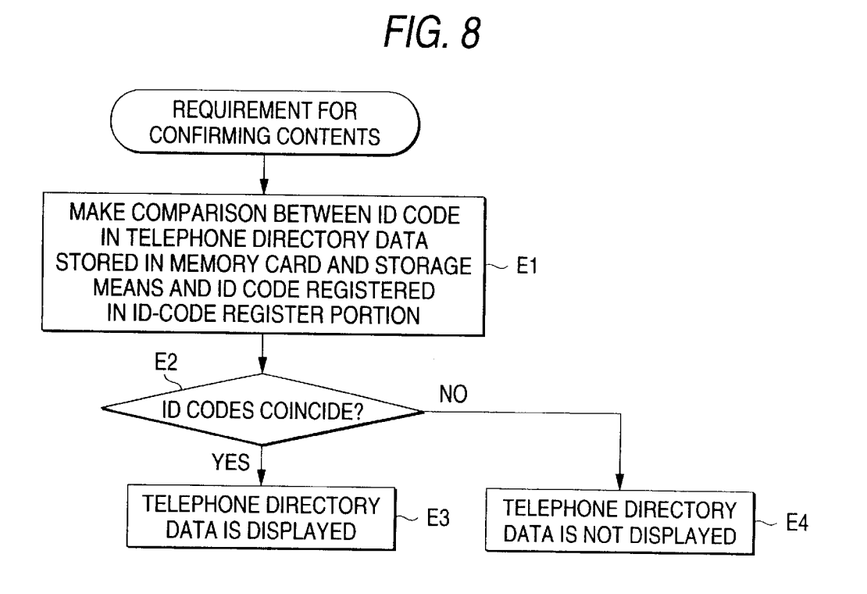
FIG. 8 is a flow chart showing the operation which is performed when requirement for confirming the contents has been performed to the telephone apparatus shown in FIG. 5.

An example of the operation which is performed when confirmation of contents of the telephone directory has been required from the user will now be described with reference to FIG. 8.

When confirmation of the contents has been required, the control means 202 makes a comparison between the ID code in the telephone directory stored in the storage means 204 and the memory card 203 and the ID code registered into the ID-code register portion in the control means 202 (step E1).

If the results of the comparison have coincided with each other (YES in step E2), the requirement for performing confirmation of the contents of the telephone directory from the user is permitted to perform display of information (step E3). If the results do not coincide with each other (NO in step E2), the requirement for confirming the contents of the telephone directory from the user is not permitted and display of information is inhibited (step E4).

When electrode code of the apparatus used when registration has been performed has been added to the ID code added to the inside portion of the telephone directory data, the difference from the terminal, the contents of which are confirmed in step D3, can be determined by making a comparison with the terminal code in the control means 202. In accordance with the result, for example, the requirement for confirming the contents can be limited in step D7. Similarly, requirement for updating telephone directory data can be limited.

As described above, according to this embodiment, when the memory card has not been connected, when a memory card having no ID code has been connected or when a memory card having an ID code different from the registered ID code has been connected, registration and display of image data of the telephone directory can be limited. When combination with a fourth embodiment to be described later is performed, compatibility between terminals can be established if the functions of terminals for registering and displaying telephone directory data are different from each other. Since only a person which has the memory card 203 is permitted to register/process/display telephone directory data base having the coincident ID codes, unlawful access from outside can be prevented. Thus, security can be improved.

The third embodiment has a structure that image data input through the communication means is related to personal information of the connected telephone. Then, image data is stored in the memory card connected to the telephone apparatus. At this time, the ID code of the memory card and the terminal code of the telephone apparatus are given. When a call has been received or requirement for confirming the contents of telephone directory data has been made, the ID code of the memory card connected to the telephone apparatus and the ID code given to the telephone directory data stored in the memory card are compared with each other. Thus, display of telephone directory data registered from another telephone apparatus is limited.

Figure 9:
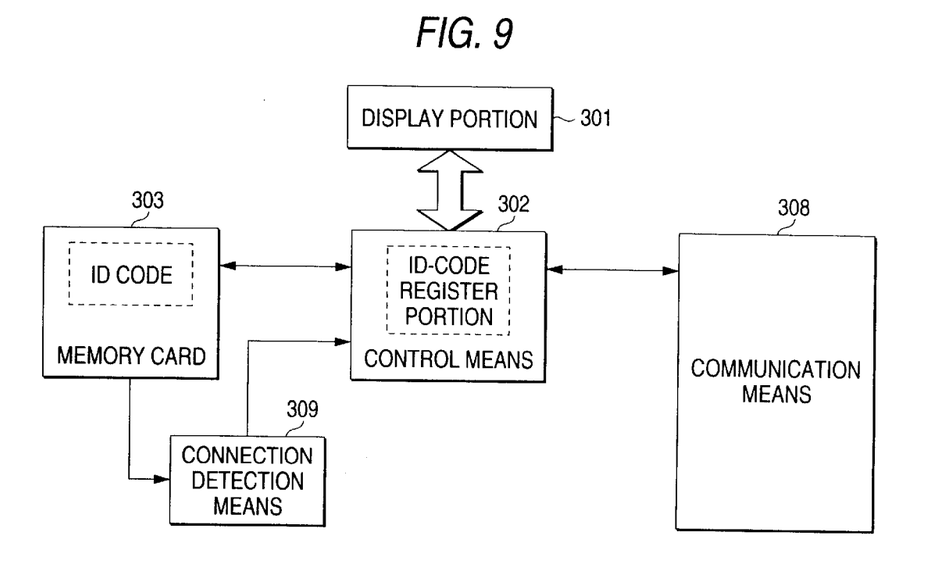
FIG. 9 is a block diagram showing a third embodiment of the telephone apparatus according to the present invention.

FIG. 9 is a block diagram showing the third embodiment of the telephone apparatus according to the present invention. The telephone apparatus having the function for registering image data incorporates a control means 302, a communication means 308 and a display portion 301. Moreover, the telephone apparatus incorporates a memory card 303 which is connected to the telephone apparatus and a connection detecting means 309 for detecting whether or not the memory card 303 has been connected and communicating a result of detection to the control means 302. The structures and functions of the portions are similar to those of the corresponding means and portion according to the second embodiment (see FIG. 5).

The operation of the telephone apparatus having the function for registering image data according to the third embodiment of the present invention will now be described. Initially, the operation of the control means 302 for registering the ID code into the ID-code register portion will now be described. When the memory card 303 has been connected to the telephone apparatus, the foregoing fact is communicated to the control means 302 through the connection detecting means 309. The control means 302 which has received the communication signal reads the ID code in the memory card 303. Then, combination of a intrinsic terminal code with which the telephone apparatus can be identified is registered into the ID-code register portion in the control means 302. When the memory card 303 has been removed from the telephone apparatus, the foregoing fact is communicated to the control means 302 through the connection detecting means 309. The control means 302 which has received the communication signal erases the ID code registered into the ID-code register portion.

Figure 10:
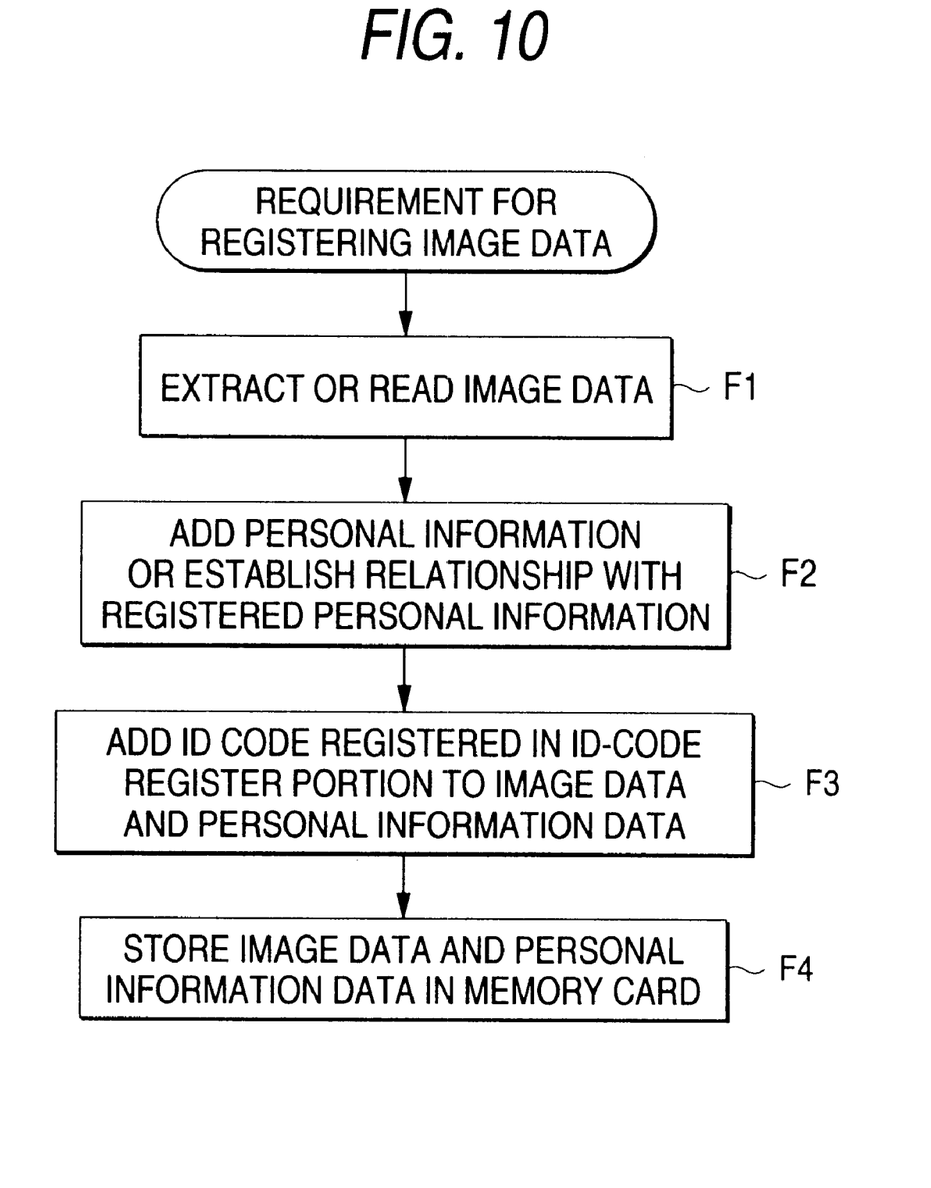
FIG. 10 is a flow chart showing the operation which is performed when image data is registered into the telephone apparatus shown in FIG. 9.

The operation which is performed when a requirement for registering image data of the telephone directory from a user has been performed from a user will now be described with reference to FIG. 10.

When the user registers image data (for example, a photograph of the face) of image data which is intrinsic to the connected telephone apparatus as information about the connected telephone of the telephone directory, image data is received through the memory card 303 so as to be extracted by the control means 302. As an alternative to this, image data stored in the memory card 303 is read by the control means 302 (step F1).

Then, the control means 302 adds personal information, such as the telephone number and name to the extracted or read image data, personal information being added owing to the operation performed by the user. As an alternative to this, registered personal information data may be related to image data (step F2). Then, the control means 302 adds the ID code registered into the ID-code register portion to both of image data and personal information data to reconstruct telephone directory data having the ID code so a to be stored in the memory card 303 (steps F3 and F4), An example of the operation which is performed when the photograph of the face (image data) of the connected telephone is displayed will now be described with reference to FIG. 11. As a precondition of FIG. 11 (as well as FIGS. 12 and 13), the memory card 303 has been connected to the telephone apparatus and the foregoing fact has been communicated to the control means 302 by the connection detecting means 309.

Figure 11:
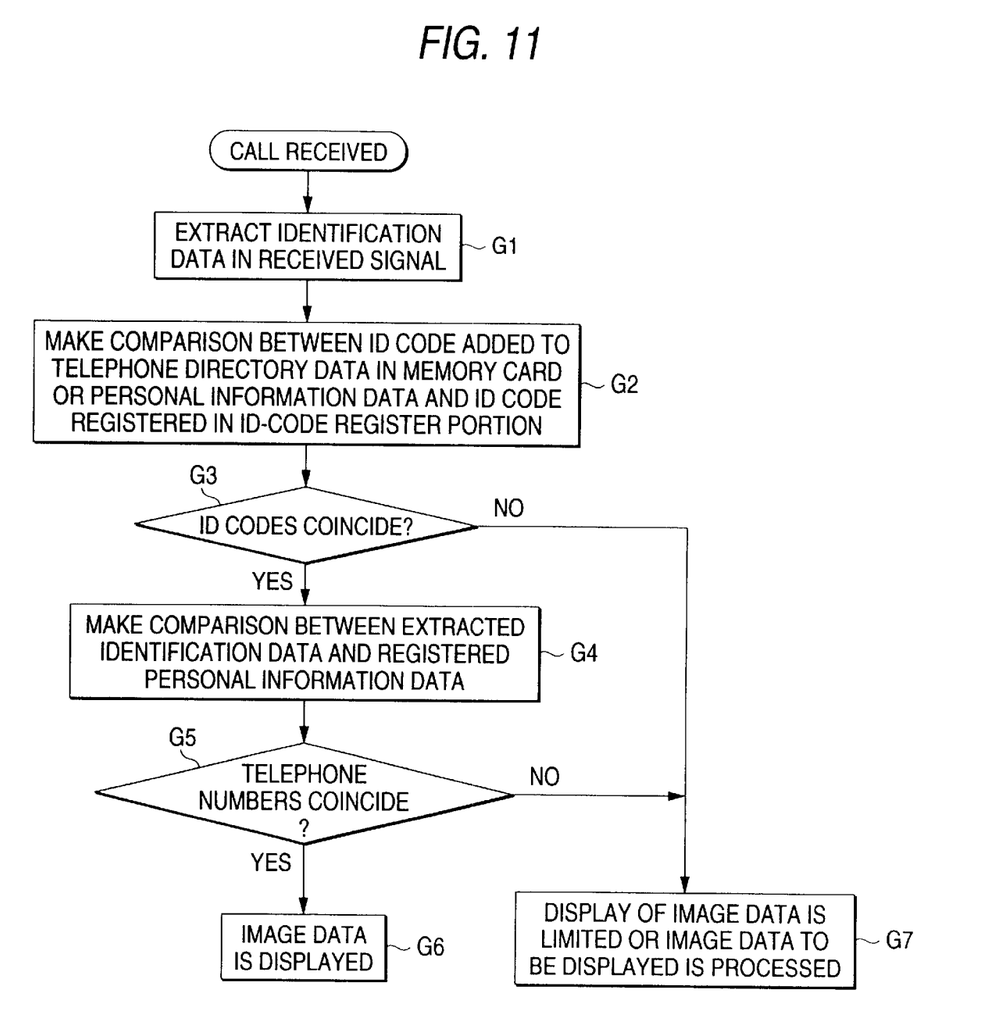
FIG. 11 is a flow chart showing the operation which is performed when a call has been received by the telephone apparatus shown in FIG. 9.

When a call has been received by the telephone apparatus of the user through the memory card 303, the control means 302 extracts identification data, such as the telephone number, indicating the connected telephone from received data (step G1).

The control means 302 makes a comparison between the ID code given to the telephone directory data stored in the display portion 301 or personal information data and the ID code registered into the ID-code register portion to determine whether or not the ID codes coincide with each other (steps G2 and G3). When the ID codes coincide with each other (YES in step G3), extracted identification data and the telephone number or the like in personal information data are compared with each other (steps G4 and G5).

Only when coincident registered data is present, telephone directory data including image data is transferred to the display portion 301. Transferred image data is displayed through the display means in the display portion 301 (step G6).

the terminal code of the telephone apparatus registered into the ID-code register portion and the ID code given to the inside portion of telephone directory data stored in the memory card 303 are compared with each other. If the control means 302 determines that compatibility of the display performance of the display portion 306 is not established as a result of the comparison (NO in step G3), transference of image data is limited or image data is processed to establish the compatibility. Then, image data is transferred to the display portion 306. Transferred image data is displayed through the display means in the display portion 301 (step G7). When a determination is made in step G5 that there is no coincident registered data, display of image data is limited and only character data is displayed (step D7).

Figure 12:
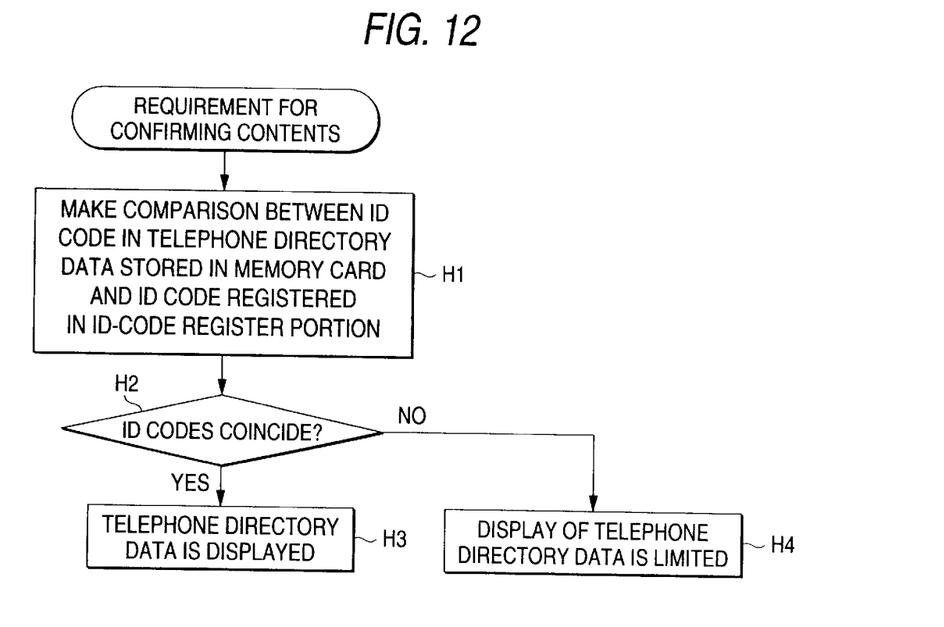
FIG. 12 is a flow chart showing the operation which is performed when requirement for confirming the contents has been made to the telephone apparatus shown in FIG. 9.

An example of the operation which is performed when requirement for confirming the contents of telephone directory data has been performed from a user will now be described with reference to FIG. 12.

When the requirement for confirming the contents has been performed from the user, a comparison is made between the ID code in the telephone directory data stored in the memory card 303 and the ID code registered into the ID-code register portion in the control means 302 (step H1). Only when a determination has been made that the ID codes coincide with each other, telephone directory data including image data is transmitted to the display portion 301. Transferred image data is displayed through the display means in the display portion 301 (step H3). If the ID codes do not coincide with each other, display of telephone directory data is limited (step H4).

That is, similarly to the displaying procedure which is employed when a call has been received, the requirement for confirming the contents of telephone directory data from the user is permitted/limited in accordance with a result of the comparison of the ID codes. A similar process may be performed to permit/limit updating of telephone directory data.

According to the third embodiment of the present invention, the memory card 303 having a memory region which is sufficiently large to store image data and the ID code stored therein is connected to the telephone apparatus having the telephone directory function. Thus, telephone directory data can directly be stored in the memory card 303 so as to be registered. Thus, the size of the memory which must be included in the telephone apparatus can be reduced. The terminal code of the telephone apparatus registered into the control means 302 and the ID code in the memory card 303 when requirement for using the telephone directory are compared with each other. Thus, use of the contents registered by another telephone apparatus, such as display and updating, can be limited. When the structure of this embodiment is combined with the fourth embodiment to be described later, compatibility between terminals can be established if the functions of the terminals for use to register telephone directory data and display the same are different from each other.

The fourth embodiment of the present invention has a structure that when the compatibility between the parameter of image data registered as telephone directory data and the performance of the display unit cannot be established, image data is converted/processed to establish the compatibility.

Figure 13:
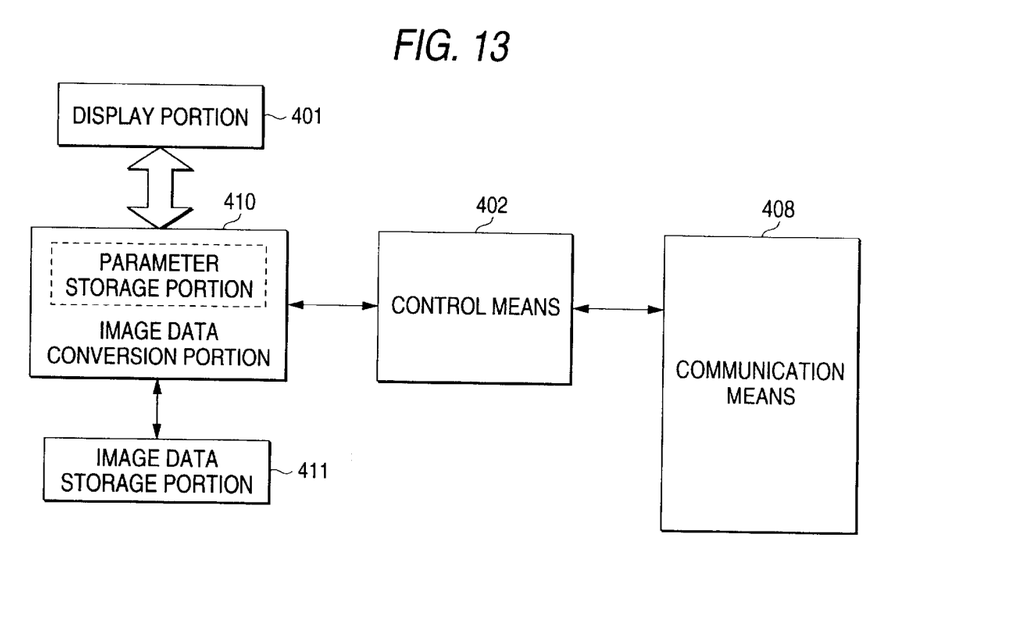
FIG. 13 is a block diagram showing a fourth embodiment of the telephone apparatus according to the present invention.

FIG. 13 is a block diagram showing the fourth embodiment of the telephone apparatus according to the present invention. The telephone apparatus having the function for registering image data incorporates a control means 402; an image-data converting portion 420 and a communication means 408 which are connected to the control means 402. A display portion 401 and an image-data storage portion 411 are connected to the image-data converting portion 420.

The image-data converting portion 410 is able to change the format and the size of image data. Moreover, the image-data converting portion 410 incorporates a parameter storage portion for storing various parameters of the display unit of the display portion and image data. The image-data storage portion 411 stores image data transmitted from the image-data converting portion 410. Stored image data is read by the image-data converting portion 410. The structures and the functions of the display portion 401, the control means 402 and the communication means 408 are the same as the corresponding portion and means according to the second embodiment or the third embodiment.

Figure 14:
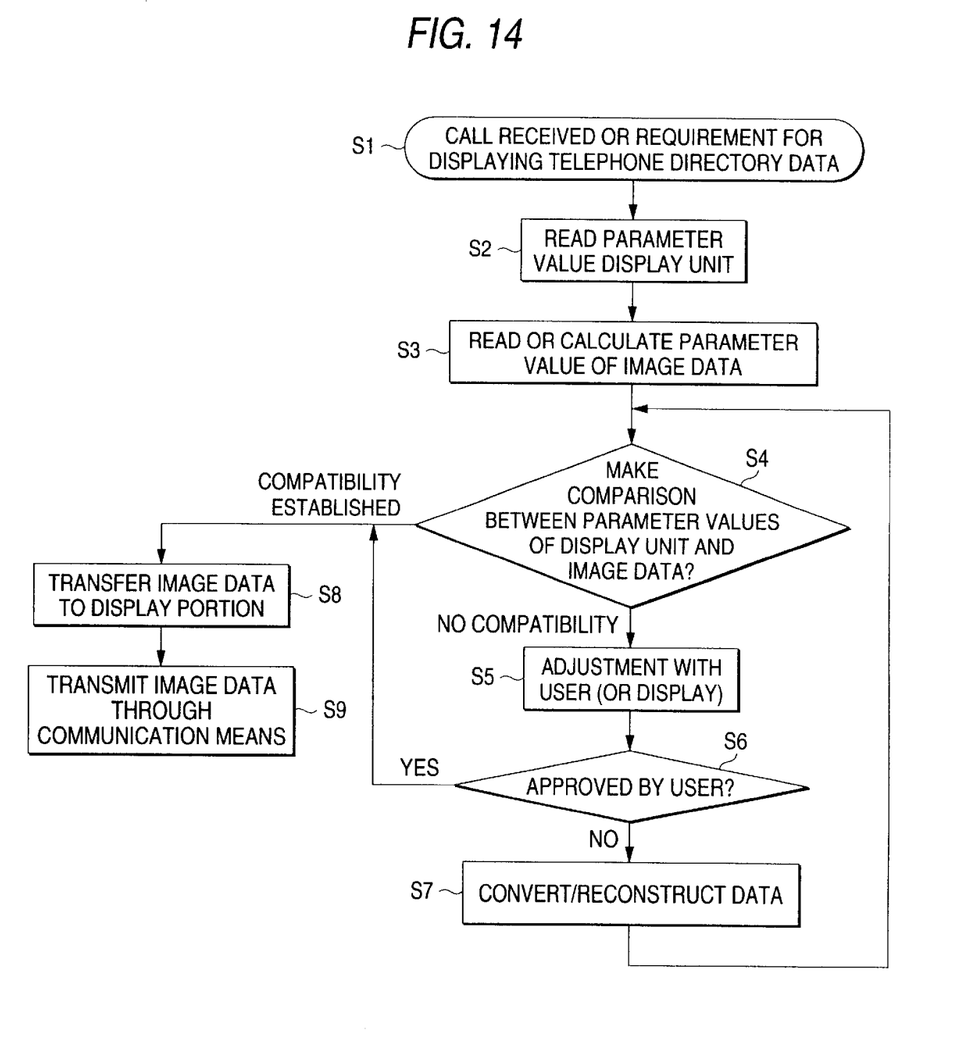
FIG. 14 is a flow chart showing the operation of the telephone apparatus shown in FIG. 13.

The operation of the telephone apparatus structured as described above will now be described with reference to a flow chart shown in FIG. 14. Note that various parameters relating to the displaying performance of the display portion 401 are previously registered into the parameter storage portion in the image-data converting portion 410. The various parameters include all of parameters relating to the display control, such as parameters relating to the display unit, for example, the size, the number of display pixels, the number of gray scale levels, white and black/color, display speed and the like relating to the display unit, the data format of the image and so forth.

When a call has been received or when requirement for displaying telephone directory data has been made from a user, subject image data is retrieved in the image-data storage portion 411 (step S1). Then, the registered parameter values relating to the displaying performance are read and set (step S2).

Then, the various parameters of image data which is the subject to be retrieved in step S1 are read or image data is retrieved to calculate required parameter values (step S3). Note that the various parameter values are same meaning as the types registered into the ID-code register portion.

Then, the control means 402 makes a comparison between the various parameters set in steps S2 and S3. If the parameter values coincide with each other or the difference satisfies a permissible range as a result of the comparison, a determination is made that the compatibility is established. Then, the operation proceeds to step S8. When the parameter values do not satisfy the permissible range, a determination is made that the compatibility is not established. Thus, the operation proceeds to step S5.

In step S5 a result of the comparison is displayed on the display portion 401 in a state where the compatibility is not established to perform adjustment with respect to the user. When a necessity for converting data is not required from the user, a determination is made in step S6 that approval is given from the user. Then, the operation proceeds to step S8. If image data must be subjected to a process of some kind or if a requirement is made from the user that, for example, display is performed such that the number of colors is reduced, a determination is made that approval is not given from the user. Then, the operation proceeds to step S7.

In step S7 the compatibility with the various parameters of the display unit is established or the requirement from the user is met by converting the format of image data or by processing the same by the image-data converting portion 410. Then, the operation is shifted to step S4. Then, step S5 to step S7 are repeated until the determination that the compatibility is established in step S4 or the determination is made that approval is given from the user in step S6.

If the compatibility is established as a result of the comparison between the two parameter values in step S4 or if approval is given from the user in step S6, image data is transferred to the display portion 401 so as to be displayed (step S8).

When a requirement for transferring telephone directory data has been made from outside through the communication means 408, the compatibility is established between the parameter value of image data which is transferred to the outside and the various parameter values of the outside display unit so that an appropriate display state is realized. Therefore, requirement for the various parameter values relating to the display of the display unit to which transference will be performed is performed to the unit to which the transference will be performed. Then, transmitted parameter values are stored in the parameter storage portion in the image-data converting portion 410.

Then, the procedures starting with step S2 are performed similarly to the foregoing operation. After a determination has been made that the compatibility is established or approval is given, the operation proceeds to step S9 as a substitute for proceeding to step S8. In step S9 image data is transmitted to the telephone (or a connected telephone) to which transference will be made through the communication means 408.

As described above, according to the fourth embodiment of the present invention, when each parameter of registered image data and the displaying performance of the display unit which will be operated are different from each other or when each parameter of registered image data and the displaying performance of the external unit to which transference will be performed are different from each other, the difference between image data and the display unit can be compensated. As a result, proper display of an image can be performed. Since a proper size of image data for the display unit can be realized, time required to complete communication with the unit to which transference is performed can be shortened. Moreover, the size of the memory required to store telephone directory data can be reduced.

What is claimed is:

1. A telephone apparatus having a telephone directory function, comprising:

communication means;

image registration means for registering an image data in to a telephone directory information database as at least one of telephone directory information, said image data being input through said communication means;

extraction means for extracting a caller identification information indicating a caller when a communication connecting request has been received from said caller through said communication means;

comparing means for comparing said caller identification information extracted by said extracting means with said telephone directory information registered in said telephone directory information database; and display means for displaying said image data registered by said image registration means in accordance with a result of comparison by said comparing means; and a memory card storing at least a user identification code;

wherein a first user identification code registered in said telephone directory information database is compared with a second user identification code stored in said memory card, and when said first user identification code coincides with said second user identification code, image functions including registration, transmission and display of image data are set to be operable, wherein said memory card having at least a memory area where said telephone directory information is stored is included or detachable, and in a case where said memory card is not connected, said functions including registration, transmission and display of said image data are set to be inoperable, after that add the following: an apparatus further comprising changing means for changing at least one parameter value of said image data stored in said telephone directory information database or said image data input through said communication apparatus wherein said parameter value is related to the displaying performance of the display.

2. A telephone apparatus according to claim 1, further comprising means for transmitting said image data or telephone directory information including said image data through said communication means.

3. A telephone apparatus according to claim 1, wherein said caller identification information is related to said image data so that said image data and said caller identification information are stored separately in different memory areas.

4. A telephone apparatus according to claim 1, wherein said user identification code stored in said memory card is automatically registered into said telephone directory information database.

5. A telephone apparatus according to claim 1, wherein said parameter is used for controlling said display means.

* * * * *

UNITED STATES PATENT AND TRADEMARK OFFICE
CERTIFICATE OF CORRECTION

PATENT NO. : 6,512,819 B1
DATED : January 28, 2003
INVENTOR(S) : Shinichi Sato et al.

It is certified that error appears in the above-identified patent and that said Letters Patent is hereby corrected as shown below:

Title page,
Item [56], References Cited, FOREIGN PATENT DOCUMENTS, please add the following reference:
-- JP    8-242307        9/1996 --

Column 2,
Line 16, after "data", please delete "a" therefor.

Column 6,
Line 13, please delete "ID)", and insert therefor -- ID --.
Line 24, please delete "when", and insert therefor -- When --.

Column 7,
Line 27, please delete "example)", and insert therefor -- example, --.

Column 9,
Line 10, please delete "F4),", and insert therefor -- F4). --.
Line 39, please delete the first occurrence of "the", and insert therefor -- The --.

Column 12,
Lines 16-17, please delete "in to", and insert therefor -- into --.
Line 25, please delete "extracting", and insert therefor -- extraction --.
Lines 45-46, please delete "inoperable, after that add the following:", and insert therefor -- inoperable; --.

Signed and Sealed this

First Day of June, 2004

JON W. DUDAS
*Acting Director of the United States Patent and Trademark Office*